United States Patent
Tsai et al.

(10) Patent No.: US 7,924,394 B2
(45) Date of Patent: Apr. 12, 2011

(54) FABRICATION METHOD OF DISPLAY PANEL AND DIELECTRIC CONFIGURATION APPLIED THERETO

(75) Inventors: Chih-Jen Tsai, Taitung (TW); Yan-Zen Chang, Tainan (TW); Jen-Chieh Yang, Changhua (TW); Chih-Yu Ke, Pingtung (TW); Chang-Chou Li, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 518 days.

(21) Appl. No.: 12/058,046

(22) Filed: Mar. 28, 2008

(65) Prior Publication Data
US 2009/0149104 A1 Jun. 11, 2009

(30) Foreign Application Priority Data
Dec. 5, 2007 (TW) ................................ 96146238 A

(51) Int. Cl.
*G02F 1/1341* (2006.01)
*G02F 1/13* (2006.01)
*G02F 1/1339* (2006.01)

(52) U.S. Cl. .................... 349/189; 349/187; 349/190
(58) Field of Classification Search .................. 349/180, 349/153–154, 158, 187–190
See application file for complete search history.

(56) References Cited

U.S. PATENT DOCUMENTS

| | | | | |
|---|---|---|---|---|
| 5,943,113 A * | 8/1999 | Ichihashi | ........................ | 349/187 |
| 7,379,150 B2 * | 5/2008 | Choo et al. | ..................... | 349/189 |
| 7,808,603 B2 * | 10/2010 | Rudin | ............................ | 349/156 |
| 2002/0008839 A1 * | 1/2002 | Miyai et al. | ................... | 349/190 |
| 2004/0110317 A1 * | 6/2004 | Choo et al. | ........................ | 438/30 |
| 2005/0078267 A1 * | 4/2005 | Motomatsu | ................... | 349/190 |
| 2006/0256277 A1 * | 11/2006 | Rudin | ............................ | 349/187 |
| 2008/0106691 A1 * | 5/2008 | Choo et al. | ..................... | 349/189 |
| 2009/0168006 A1 * | 7/2009 | Chen et al. | ..................... | 349/153 |
| 2010/0060844 A1 * | 3/2010 | Sawatari et al. | ............... | 349/187 |

FOREIGN PATENT DOCUMENTS

| | | |
|---|---|---|
| CN | 1506735 | 6/2004 |
| JP | 2006293348 A | 10/2006 |
| KR | 10-20040048671 A | 6/2004 |

* cited by examiner

*Primary Examiner* — Rhonda S Peace
(74) *Attorney, Agent, or Firm* — Muncy, Geissler, Olds & Lowe, PLLC

(57) ABSTRACT

A fabrication method for a display panel and dielectric configuration applied thereto is provided according to the present invention. The dielectric configuration of the display panel is applicable at atmospheric pressure and to a lower substrate having a surface formed with a dielectric. The fabrication method includes forming at least one lateral line segment and a plurality of longitudinal line segments on the surface of the lower substrate, thereby enabling a process of dispensing dielectric to be performed thereon at atmospheric pressure, and accordingly overcoming the drawbacks of the prior art.

18 Claims, 8 Drawing Sheets

FABRICATION METHOD OF DISPLAY PANEL AND DIELECTRIC CONFIGURATION APPLIED THERETO

BACKGROUND OF THE INVENTION

1. Field of the Invention

This invention generally relates to a technique of fabricating display panels, and more specifically, to a fabrication method for a display panel with a dielectric configuration applied thereto.

2. Description of Related Art

Liquid crystal display (LCD) technology is rapidly replacing conventional cathode ray tube (CRT) technology in the market. Compared with heavy and bulky CRT displays, liquid crystal displays have many obvious advantages, such as being lightweight, having lower power consumption, emitting less radiation, and possessing soft and clear images, and have thus become popular with consumers. Nevertheless, it is still desirable to enhance the product quality and lower production costs, and each manufacturer is looking for a technological edge in the market.

In the process of manufacturing display panels, liquid crystal filling and end-sealing are essential procedures for filling in the dielectric, such as liquid crystal. The vacuum liquid crystal filling technique and one drop filling (ODF) technique are two presently applied modes of fabricating liquid crystal panels.

In the vacuum liquid crystal filling technique, first, a few sheets of upper and lower substrates are precisely aligned and abutted to each other, forming openings for filling liquid crystal therein. Next, this batch of aligned and abutted panels is placed on a processing utensil, and the panels and utensil are put inside a vacuum chamber along with a liquid crystal bath. Then, after the vacuum chamber is in a complete vacuum state, the panels are submerged in the liquid crystal bath to fill-in the liquid crystal openings. Afterwards, dry air is brought into the enclosed vacuum chamber, thereby taking the enclosed chamber back up to standard atmospheric pressure. Accordingly, by way of capillary action and pressure differences, liquid crystal is gradually introduced into the gaps or openings of the panels. Then, after the enclosed vacuum chamber has been gradually brought back to normal atmospheric pressure, the panels are removed. However, in the process, bulges will often form on surface of the panels after crystal liquid is introduced into the gaps, and so a flatting process must be applied. After the flatting process, excess liquid crystal is wiped away, and then a sealant is applied to seal up the openings, thus completing the process.

However, this vacuum liquid crystal filling technique takes a long time to complete the full process. Moreover, the process not only consumes a large amount of liquid crystal, but also wastes the excess liquid crystal between the panels. In addition, capillary action is not strong enough to fill-in small cell gaps of the panels. In addition to these drawbacks, the process is not ideally suited to achieve the demands of fabricating larger-scale panels. Furthermore, the equipment required for processing in a vacuum environment is very expensive. There are also additional difficulties in the operational procedures of this fabrication technique. In summary, with the disadvantages of a time-consuming fabrication process, high production costs, and low production yield, the above conventional process has limited application scope.

Referring to the one drop filling technique, there are some advantages compared to the vacuum liquid crystal filling technique. The one drop filling technique has a less time-consuming fabrication process, consumes less liquid crystal, and exhibits a higher production yield. Also, small cell gaps of the panels are better filled by use of a spacer and the process is more applicable to the fabrication demands of large size panels. In the one drop filling fabrication technique, first, a sealant is dispensed on the lower substrate to restrict the area in which liquid crystal is allowed to run/flow. Next, an appropriate amount of liquid crystal is dropped in. Then, after the fabrication process applied to the lower substrate is complete, the upper substrate and lower substrate are placed in a vacuum environment, wherein a high precision aligning and pressing process is conducted and ultraviolet rays are applied for curing, thus completing the process of liquid crystal filling and end-sealing.

FIGS. 1A and 1B illustrate a fabrication method for a liquid crystal device according to U.S. Pat. No. 5,978,065. Referring to FIGS. 1A and 1B, first an upper substrate 1 and a lower substrate 2 are provided, and a plurality of spacers (not shown) are arranged between the upper and the lower substrates 1 and 2. These spacers provide a means of forming gaps between the upper and the lower substrates 1 and 2. Then, in the process of filling-in dielectric, liquid crystal 3 is applied on the lower substrate in an irregular pattern. Finally, the upper substrate 1 is pressed on to the lower substrate 2 by first rolling and pressing over the upper substrate 1 with a thermal pressing roller 4a, and then pressing two more times by rolling and pressing with two auxiliary pressure rollers 4b and 4c in an effort to control the pressure applied to the upper and the lower substrates 1 and 2.

However, in the actual operational process, the pressure applied by the thermal pressing roller is unlikely to be well controlled. If the pressure is too low, the liquid crystal will not be dispersed adequately, resulting in unevenness. If the pressure is too high, the spacers are likely to be crushed, and consequently cause damage to the substrate. Moreover, since the dropped liquid crystal is in an irregular pattern, a curved wave front behavior is likely to occur in the liquid crystal material while the thermal pressing roller is running over the substrate, and bubbles in the liquid crystal are consequently produced, thereby lowering production yield.

FIGS. 2A and 2B illustrate another fabrication method for a liquid crystal display panel according to the disclosure of U.S. Pat. No. 6,734,943. As shown in the FIGS., the technique of the patent provides an upper substrate 11, a lower substrate 10, and a plurality of spacers between the upper substrate 11 and the lower substrate 10, wherein the spacers are for providing gaps between the upper substrate 11 and the lower substrate 10. Also, the sealant 101 is dispensed along the periphery of the coating region of the lower substrate 10, and a plurality of air outlets 102 are preset in the sealant. In the process of filling in liquid crystal, first, a layer of liquid crystal 3 is dropped on top of the lower substrate 10. Then, the upper substrate 11 and the lower substrate 10 are placed together and pressure is applied to squeeze out air bubbles in the liquid crystal between the upper substrate 11 and the lower substrate 10 via the plurality of air outlets 102. However, in this method of dispersing the liquid crystal between the upper and the lower substrates by means of squeezing, the required amount of liquid crystal must be pre-calculated quite precisely, and the process also must be conducted in a vacuum environment, thereby increasing not only the production costs but also operational difficulties.

Furthermore, although both of the two aforesaid techniques for filling-in liquid crystal are conducted in a strictly controlled vacuum environment, the air bubble problem cannot be avoided completely; and since vacuum equipment is essential, high production costs is unavoidable. Also, the strict control necessary to ensure a complete vacuum environment causes difficulties in application. In addition, for future application to related products, such as flexible displays, electronic books, polymer panels, and others, the production cost is certain to remain high while the yield is low, thereby limiting applicability in the industry.

Hence, it is a critical issue in the industry to develop a method to fabricate display panels at atmospheric pressure that can effectively solve the drawbacks of the prior arts as mentioned above.

SUMMARY OF THE INVENTION

In view of the disadvantages of the prior art mentioned above, it is a primary objective of the present invention to provide a fabrication method for a display panel and dielectric configuration applied thereto that are applicable at atmospheric pressure.

It is another objective of the present invention to provide a fabrication method that allows flexible substrates of both large and small sizes to be employed.

It is a further objective of the present invention to provide a fabrication method for a display panel and dielectric configuration applied thereto for preventing formation of bubbles.

It is a further objective of the present invention to provide a fabrication method for a display panel and dielectric configuration applied thereto for reducing production costs and operational difficulty, and also increasing production yield.

To achieve the aforementioned and other objectives, a fabrication method for a display panel that is applicable at atmospheric pressure is provided according to the present invention. The fabrication method for a display panel includes the steps of providing an upper flexible substrate and a lower substrate, wherein one end of each substrate is fixed; forming a sealant structure on a surface of the lower substrate; forming a dielectric on a surface of the lower substrate correspondingly within the sealant structure, thereby forming a pattern including at least one lateral line segment and a plurality of longitudinal line segments; rolling and pressing the upper flexible substrate starting from the lateral line segment in a fixed direction with the use of a rolling press, thereby evenly dispensing the patterned dielectric formed within the sealant structure between the upper flexible substrate and the lower substrate; and carrying out a process for curing the upper flexible substrate and the lower substrate.

In the fabrication method for a display panel of the present invention, the upper flexible substrate and the lower substrate are a combination of transparent substrates or a combination of transparent and opaque substrates. The lower substrate is either a flexible substrate or a glass substrate, wherein the lower substrate is one of a polycarbonate (PC) substrate, polyether resin (PES) substrate, polyethylene terephthalate (PET) substrate, and polyimide (PI) substrate. The dielectric is liquid crystal. The dielectric is formed by drop filling, spray printing, tape adhering, or brush dispensing. Preferably, the rolling press is a flexible pressing roller. The included angle between the lateral line segment and the central axis of the rolling press is within the range of −10 to 10 degrees, and the included angle between the longitudinal line segments and the central axis of the rolling press is within the range of 80 to 100 degrees. Furthermore, in one embodiment, the plurality of longitudinal line segments are in a pattern, and for each of the longitudinal line segments of the pattern, the closer it is to edge of the longitudinal line segments, the longer it is. The lateral line segment and the longitudinal line segments are straight, dotted, broken, curved, or irregular line segments, and the included angle between the lateral line segment and the longitudinal line segments is within the range of 80 to 100 degrees. The curing process is performed by correspondingly pressing and curing the sealant.

The dielectric configuration for a display panel of the present invention is applicable at atmospheric pressure and to the lower substrate having a surface formed with the dielectric. The dielectric configuration comprises at least one lateral line segment and a plurality of longitudinal line segments formed on the surface of the lower substrate. In one embodiment, the plurality of longitudinal line segments are in a pattern, in which for each of the longitudinal line segments, the closer it is to edge of the longitudinal line segments, the longer it is.

In the dielectric configuration for a display panel of the present invention, the dielectric is liquid crystal, and the dielectric is formed by drop filling, spray printing, tape adhering, or brush dispensing. The included angle of the lateral line segment and the longitudinal line segments is within the range of 80 to 100 degrees, and the lateral line segment and the longitudinal line segments are straight, dotted, broken, curved, or irregular line segments.

In summary, the present invention forms a dielectric on the surface of the lower substrate in a specific pattern including at least one lateral line segment and a plurality of longitudinal line segments, and then by using a rolling press, rolls and presses the upper flexible substrate in a fixed direction, thereby evenly dispensing the patterned dielectric between the upper flexible substrate and the lower substrate, and subsequently curing the dielectric. Therefore, the present invention is capable of filling in the dielectric at atmospheric pressure in the process of fabricating a display panel, and preventing formation of air bubbles, and further lessening difficulties in operation and reducing production costs for liquid crystal panels produced with the process.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention, these and other advantages and effects being readily understood by those in the art after reading the disclosure of this specification. The present invention can also be performed or applied by other differing embodiments. The details of the specification may be changed on various points and adjusted for various applications, and numerous modifications and variations can be devised without departing from the spirit of the present invention.

FIGS. 3 through 6 are diagrams illustrating embodiments of the fabrication method for a display panel and dielectric configuration applied thereto according to the present invention. Note that the fabrication method for a display panel and dielectric configuration applied thereto of the present invention may comprise other components, but in order to simplify the figures and descriptions, only the basic and/or essential structures are depicted and described, such depictions and descriptions not being restrictive of the scope of the present invention.

Figure 1A:
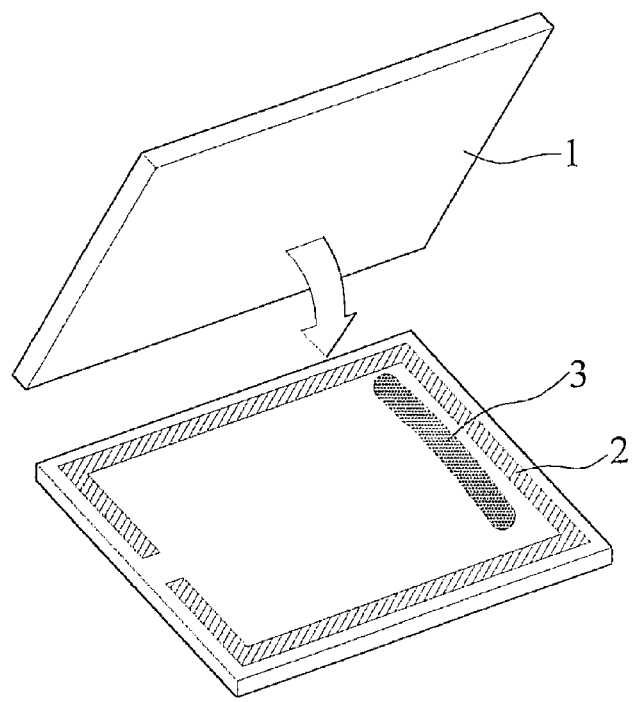
FIGS. 1A and 1B are diagrams illustrating one technique of the prior art.
Figure 1B:
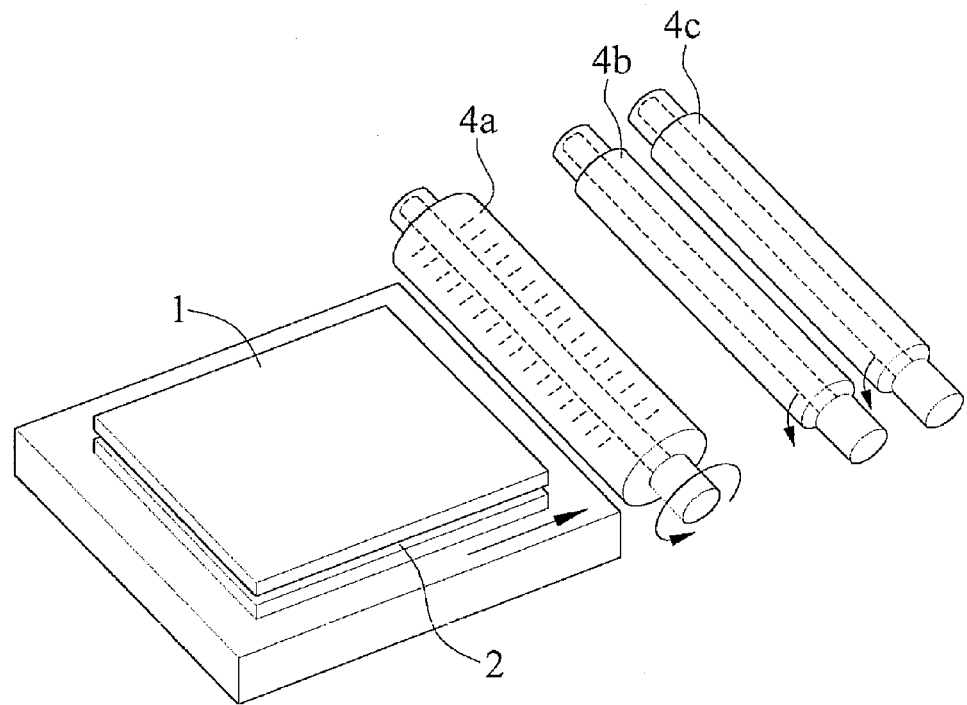
Figure 2A:
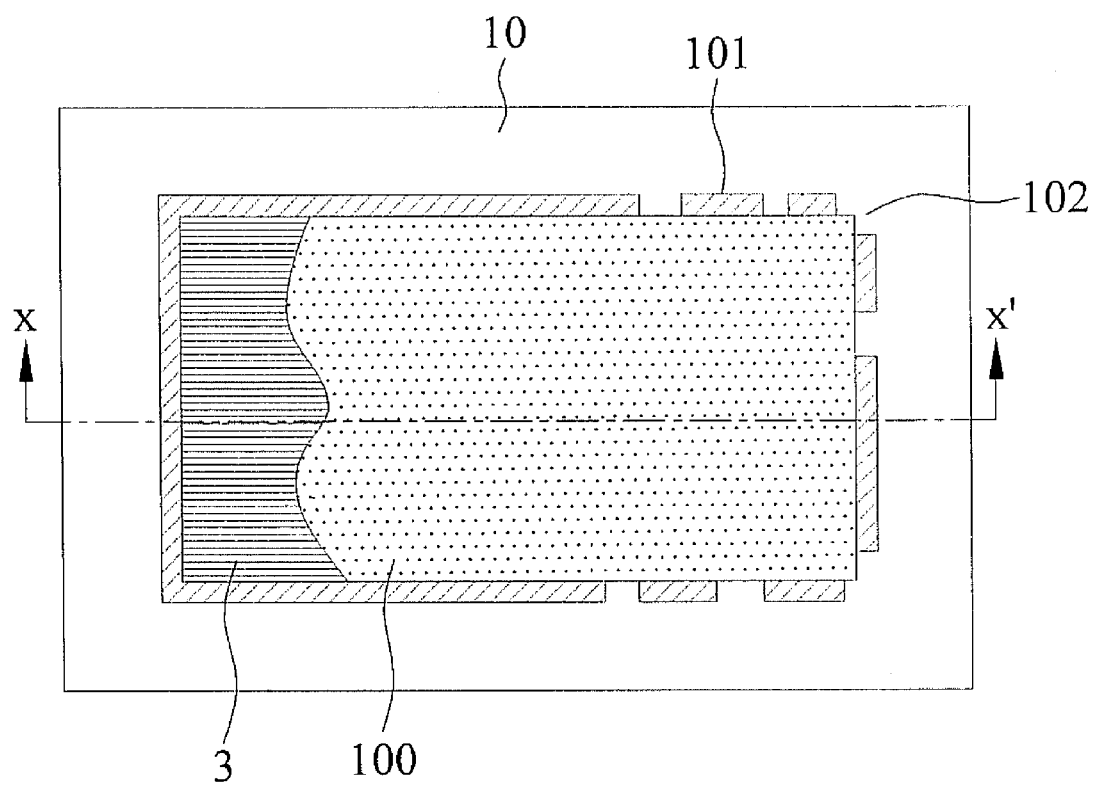
FIGS. 2A and 2B are diagrams illustrating another technique of the prior art.
Figure 2B:
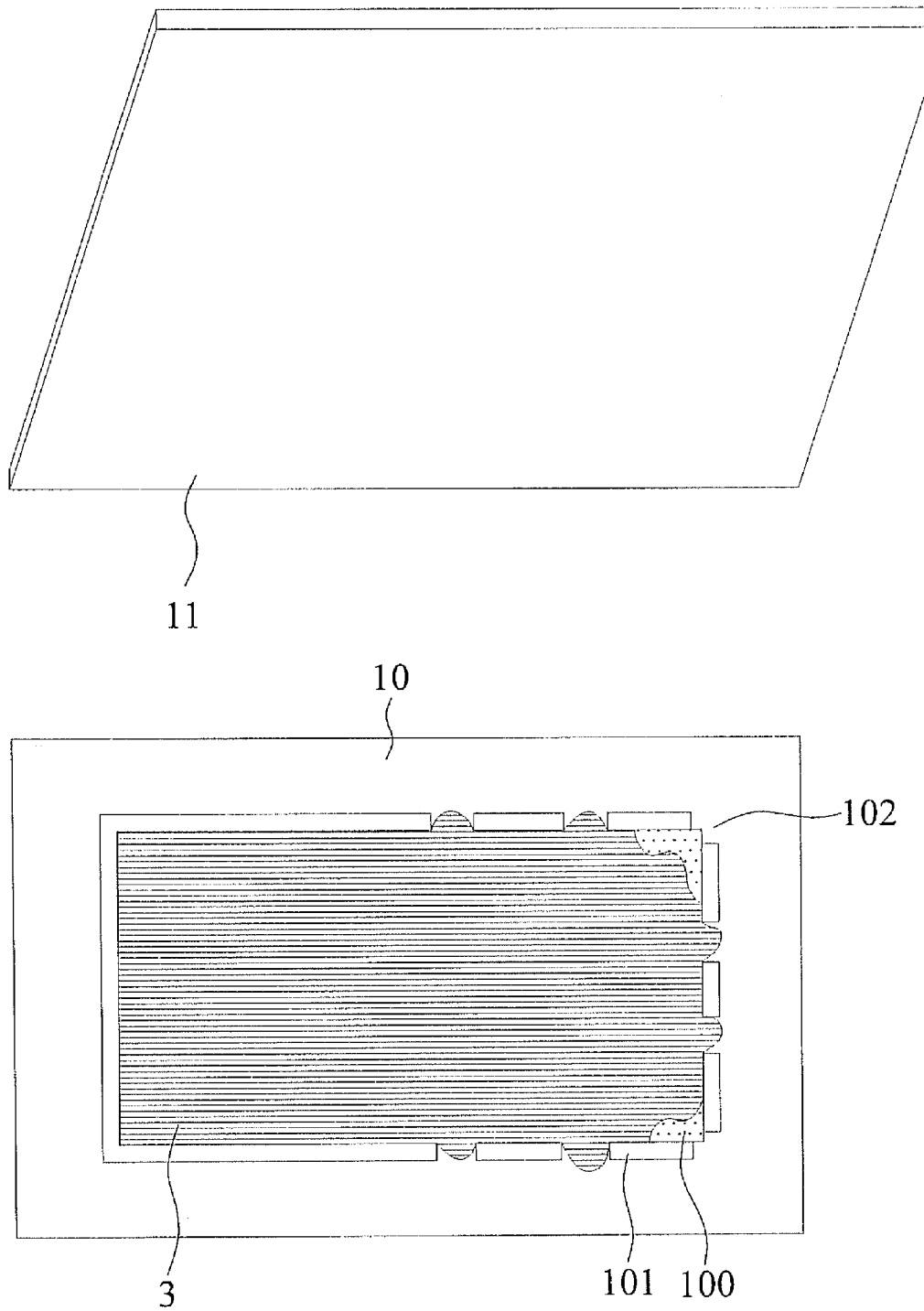
Figure 3:
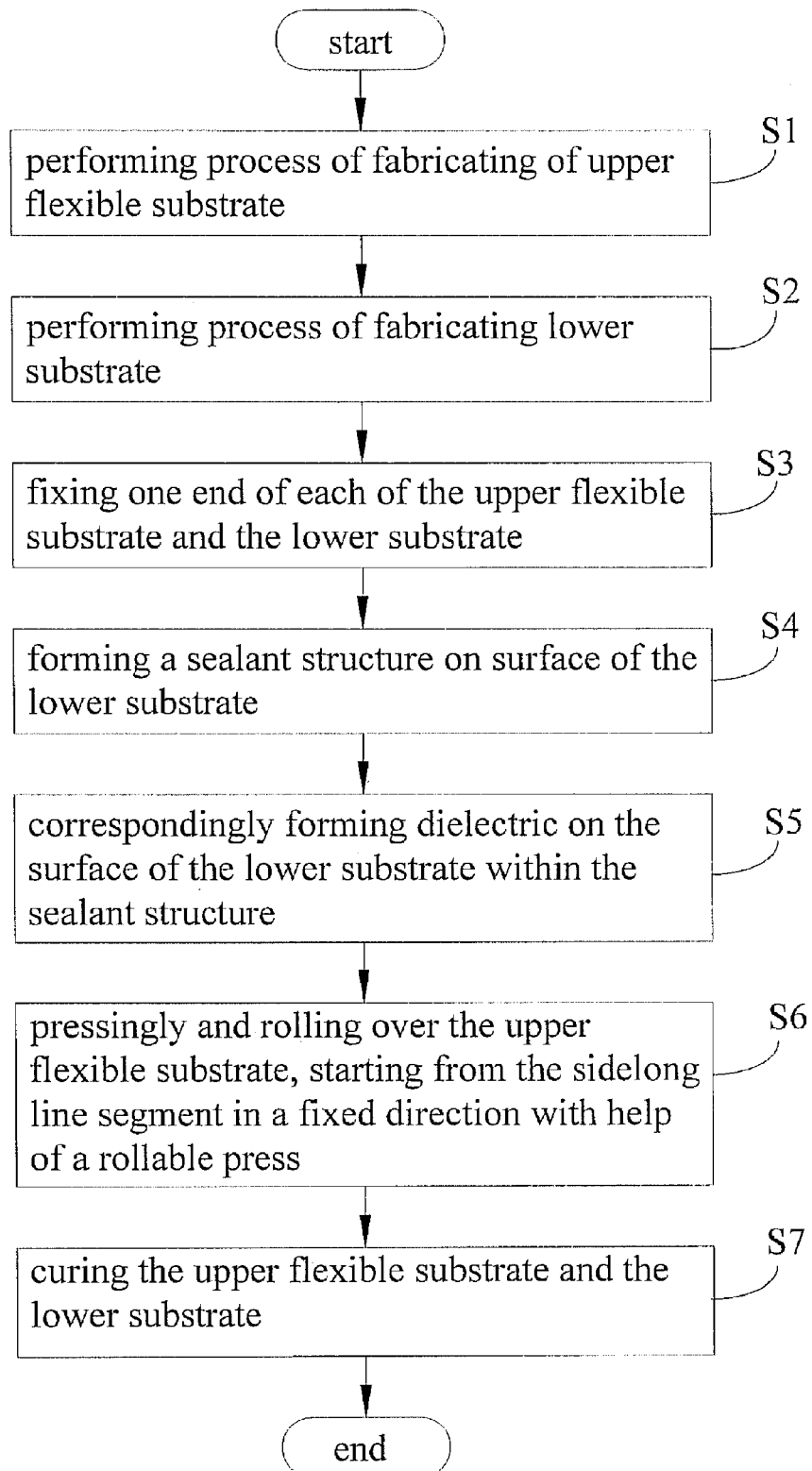
FIG. 3 is a flowchart illustrating the fabrication method for a display panel according to the embodiment of the present invention.

Referring to the figures, FIG. 3 is a flowchart of the fabrication method for a display panel of the present invention, and FIGS. 4A through 4E are operational diagrams of a fabrication method for a display panel of the present invention. As shown in the FIGS., the fabrication method for a display panel is applicable at atmospheric pressure, and in the present embodiment, the display panel is applicable to displays for electronic devices, such as personal computers, notebook computers, personal digital assistants, MP3/MP4 players, and others.

As shown in FIGS. 3 and 4A through 4E, the fabrication method for a display panel of the present invention comprises the following steps. In steps S1, an upper flexible substrate 50 is prepared by conducting a fabricating process that anticipates that the upper flexible substrate 50 is to be laid on top of a lower substrate 51. Then proceed to step S2.

In step S2, the lower substrate 51 is prepared, wherein the lower substrate 51 has a microstructure thereon to provide gaps between the upper flexible substrate 50 and the lower substrate 51 after the two are placed together. The lower substrate 51 is a flexible substrate, glass substrate, or other suitable substrate, and is preferably one of a polycarbonate (PC) substrate, polyether resin (PES) substrate, polyethylene terephthalate (PET) substrate, and polyimide (PI) substrate. Then proceed to step S3.

In the step S3 (referring to FIG. 4A), one end of each of the upper flexible substrate 50 and the lower substrate 51 are fixed to each other. In the present embodiment, in one method of fixing one end of each of the upper flexible substrate 50 and the lower substrate 51, for example, one end of each of the upper flexible substrate 50 and the lower substrate 51 are fixed to a bottom board 6 with the help of a clasp 61. However, any other fixing method that is capable of providing the same purpose as the abovementioned method of fixing the upper flexible substrate 50 and the lower substrate 51 is applicable to the present invention, and since this fixing technique is well known to those in the air, and is not a feature of the present invention, no further detailed description is provided herein. Also, it should be noted that the purpose of pre-fixing one end of each of the upper flexible substrate 50 and the lower substrate 51 is to avoid poor alignment in a subsequent process of pressing the upper flexible substrate 50 and the lower substrate 51 together which would be as a result cause poor product quality. The upper flexible substrate 50 and the lower substrate 51 can be either a combination of transparent substrates or a combination of transparent and opaque substrates. Then, proceed to step S4.

Figure 4A:
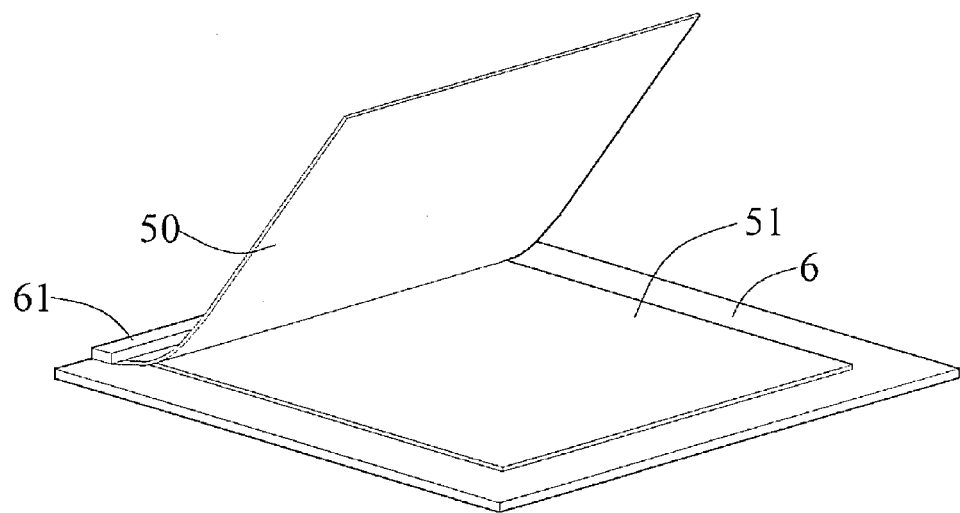
FIGS. 4A through 4E are operational diagrams illustrating the fabrication method for a display panel according to the embodiment of the present invention.
Figure 4B:
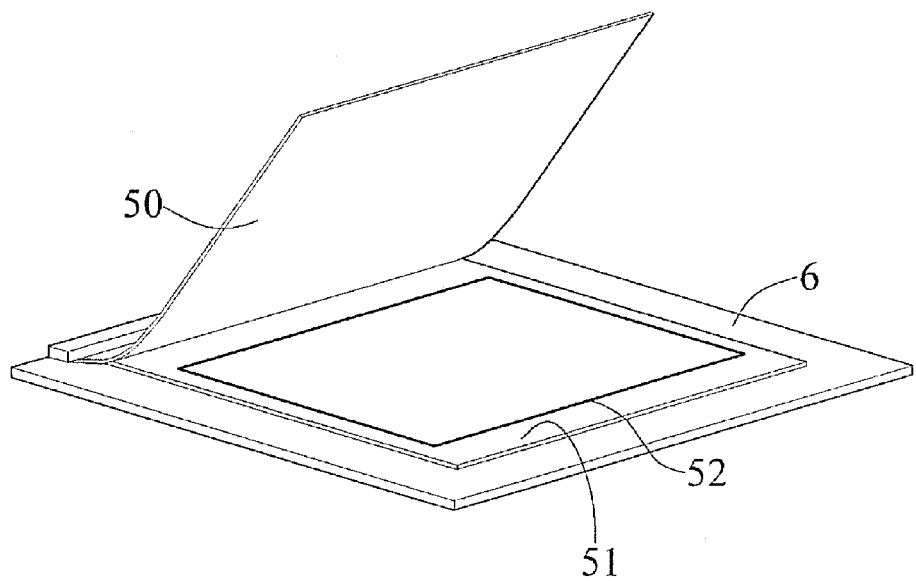

In the step S4, a sealant structure 52 as shown in FIG. 4B is formed on surface of the lower substrate 51. Then, proceed to step S5.

Figure 4C:
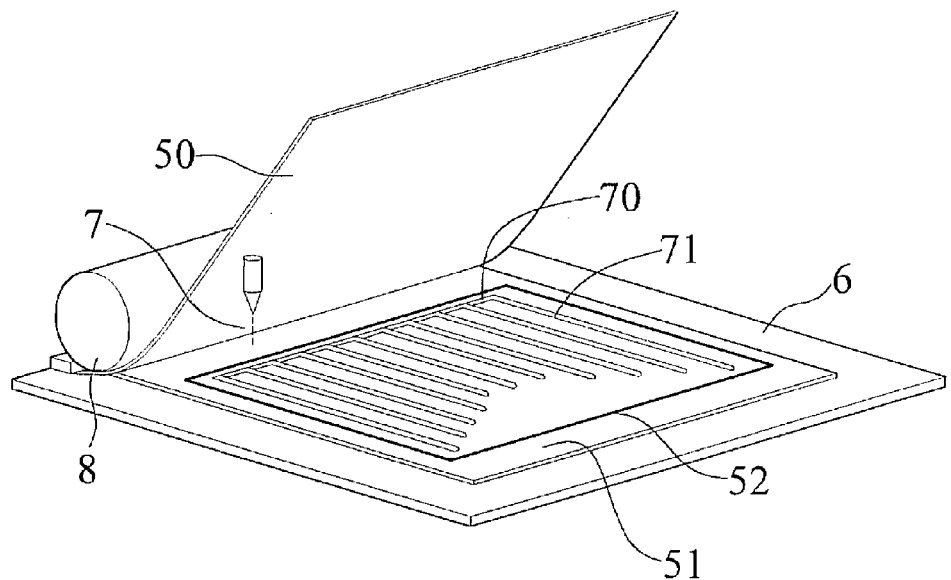

In the step S5, a dielectric 7 as shown in FIG. 4C is formed on the surface of the lower substrate 51 within the sealant structure 52. In the present embodiment, the sealant structure is for preventing the dielectric 7 from overflowing the surface of the lower substrate 51. The sealant structure 52 can be formed by dispensing an ultraviolet-curable sealant. Thus, the dielectric 7 is prevented from overflowing the surface of the lower substrate 51, and is then cured between the upper flexible substrate 50 and the lower substrate 51. The mode of forming the dielectric 7 correspondingly within the sealant structure 52 can be drop filling, spray printing, tape adhering, or brush dispensing. The dielectric 7 is liquid crystal, and is for forming a pattern that includes at least one lateral line segment 70 and a plurality of longitudinal line segments 71. In the present embodiment, for each of the longitudinal line segments of the pattern, the closer it is to edge of the longitudinal line segments, the longer it is. However, in other embodiments, it can be accordingly revised. In the present embodiment, the included angle between the lateral line segment 70 and central axis of a rolling press 8 is within a range of −10 to 10 degrees, and the included angle between the longitudinal line segments 71 and the central axis of the rolling press 8 is within a range from 80 to 100 degrees. Therefore, the included angle between the lateral line segment 70 and the longitudinal line segments is within a range from 80 to 100 degrees, wherein preferably, the lateral line segment 70 is parallel with the central axis of the rolling press 8, the longitudinal line segments 71 are perpendicular to the central axis of rolling press 8, and the longitudinal line segments 71 are perpendicular to the lateral line segment 70. After completing step S5, proceed to step S6.

Figure 4D:
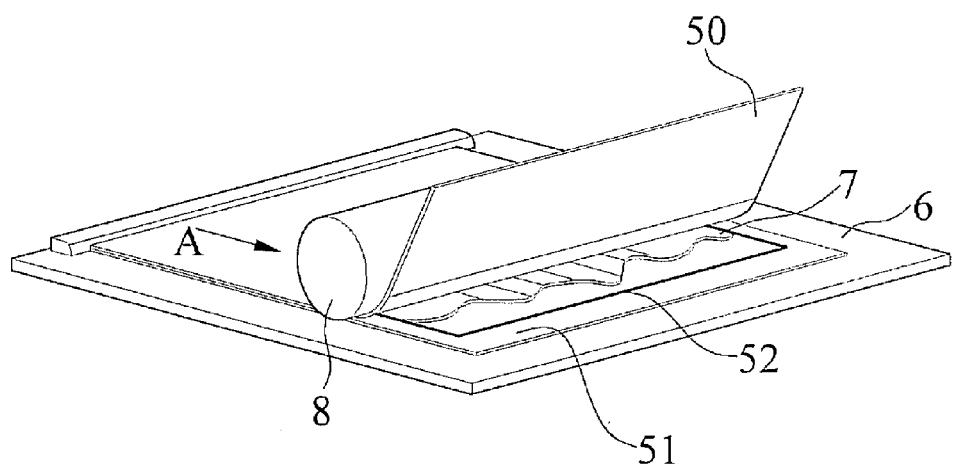

In the step S6, the upper flexible substrate 50 is rolled and pressed as shown in FIG. 4D, starting from the lateral line segment 70 in a fixed direction by use of a rolling press 8. In the present embodiment, the rolling press 8 is a flexible pressing roller, wherein the rolling press 8 rolls over the upper flexible substrate 50 in the specific direction indicated by arrow A shown in FIG. 4D. When the rolling press 8 rolls over the upper flexible substrate 50 with its central axis parallel to the lateral line segment, the dielectric 7 of the lateral line segment 70 flows forward and fills in any gaps, while the dielectric 7 of the longitudinal line segments 71 disperses sideward and fills in any gaps, thereby effectively preventing the formation of air bubbles along the wave front and between other segments of the pattern. Consequently, the dielectric 7 within the sealant structure 52 is evenly dispersed between the upper flexible substrate 50 and the lower substrate 51. In practice, the rolling press 8 can be maintained at a temperature suitable for thermal curing. Therefore, when the rolling press 8 is applied in this rolling and pressing process, it is capable of pressing the sealant structure 52 formed on the surface of the lower substrate 51, thereby curing the dielectric 7 between the upper flexible substrate 50 and the lower substrate 51, and, at the same time, correspondingly pressing and curing the sealant structure 52. However, if the rolling press 8 is not at the temperature for thermal curing, step S7 should be followed, as described next.

Figure 4E:
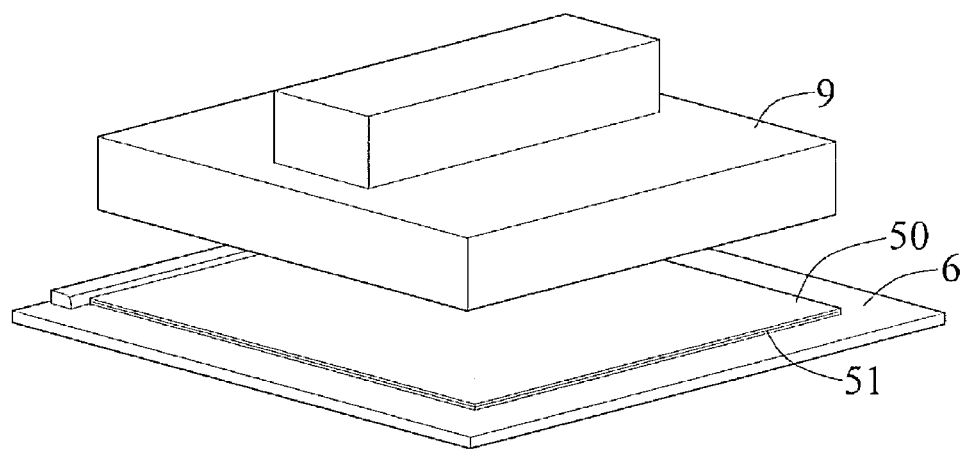

In step S7, the upper flexible substrate 50 and the lower substrate 51 are cured. In the present embodiment, a curing device 9 as shown in FIG. 4E is applied to perform a curing process on the upper flexible substrate 50 and the lower substrate 51 corresponding to pressing and curing the sealant structure. However, in other embodiments, other curing techniques may be applied, such as aligned pressing and bonding, ultraviolet ray curing, and others, these curing techniques being well known in the art, and therefore not further detailed herein.

Figure 5:
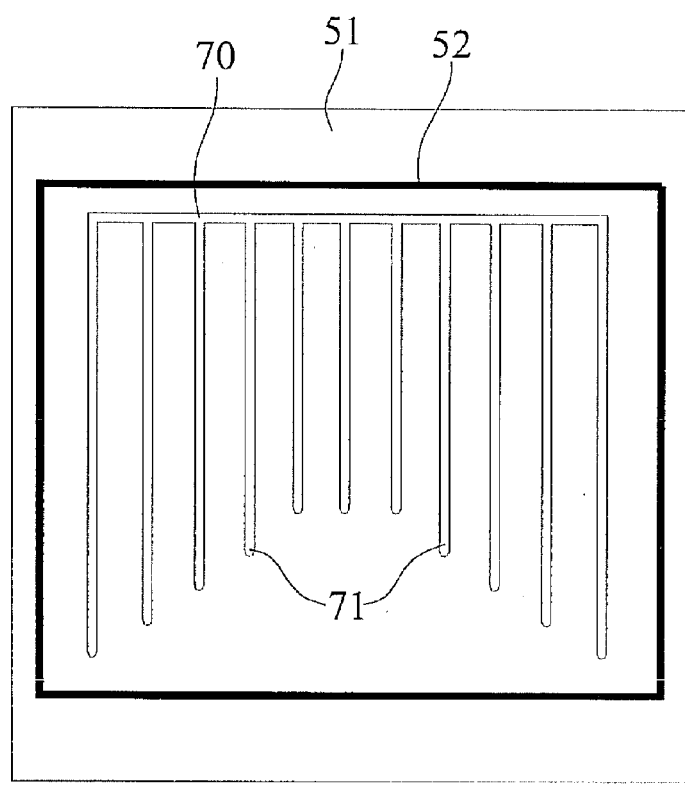
FIG. 5 is a diagram illustrating the dielectric configuration for a display panel according to the embodiment of the present invention.

Referring to FIG. 5, which is a diagram illustrating an embodiment of the dielectric configuration of a display panel of the present invention, the dielectric configuration of a display panel of the present invention includes at least one lateral line segment 70 and a plurality of longitudinal line segments 71.

The lateral line segment 70 is formed on a surface of the lower substrate 51. In the present embodiment, the lateral line segment 70 can be formed by drop filling, spray printing, tape adhering, brush dispensing, or other methods capable of performing an equivalent formation, and the lateral line segment 70 can include a straight and regular line segment, but is not restricted to those particular features.

The longitudinal line segments 71 are formed on the same surface of the lower substrate 71 in a pattern, wherein for each of the longitudinal line segments 71, the closer it is to one of the two longitudinal edges perpendicular to the lateral line segment, the longer it is (as shown in FIG. 5). In the present invention, the longitudinal line segments 71 can be formed by drop filling, spray printing, tape adhering, brush dispensing, or other methods, and the longitudinal line segments 71 can include straight and regular line segments, but are not restricted these particular features.

Figure 6A:
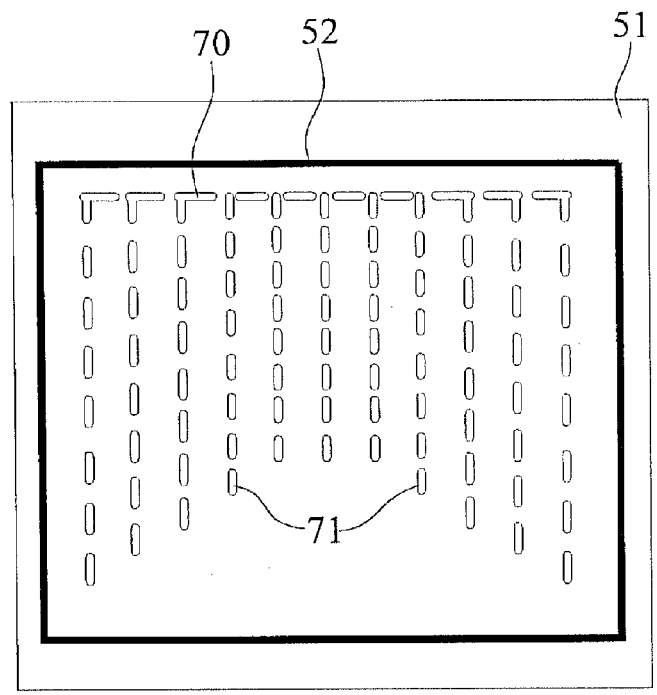
FIG. 6 is a diagram illustrating the dielectric configuration of a display panel according to the embodiment of the present invention.
Figure 6B:
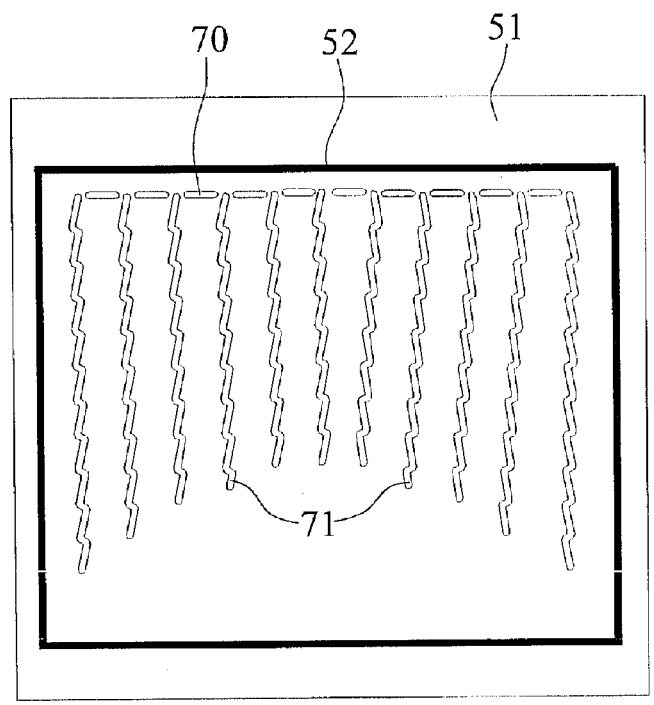

As shown in FIGS. 6A and 6B, the dielectric 7 forms a pattern that includes at least a lateral line segment 70 and a plurality of longitudinal line segments 71, wherein for each of the longitudinal line segments, the closer it is to one of the two longitudinal edges, the longer it is, and such segments may be dotted, broken, curved, irregular, or other segments. In addition, in the pattern including at least one lateral line segment 70 and a plurality of longitudinal line segments 71, there must be an included angle between the lateral line segment and central axis of the rolling press 8 (for example, an included angle within a range of −10 to 10 degrees), and there must be an included angel between the longitudinal line segments 71 and the central axis of the rolling press 8 (for example, an angle within a range of 80 to 100 degrees), and also there must be an included angle between the lateral line segment 70 and the longitudinal line segments 71 (for example, an angle within a range of 80 to 100 degrees).

It should be specifically stated herein that the included angle between the lateral line segment 70 and the longitudinal line segments 71 is in a range of 80 to 100 degrees, wherein one or some of the longitudinal line segments meet with and are perpendicular to the lateral line segment 70. Also, the plurality of longitudinal line segments 71 are in a pattern, wherein for each of the longitudinal line segments 71, the closer it is to a longitudinal edge, the longer such a segment is. However, it is well understood to those in the art that the lengths of the plurality of longitudinal line segments 71 are not restricted to that as stated herein. In the present embodiment, the pattern of the longitudinal line segments is arranged as that the closer to a longitudinal edge the longer such a segment is. However, in other embodiments, the longitudinal line segments can be in a pattern that the closer to an edge, the shorter such a segment is. Alternately, all segments can be of the same length, or in other patterns. In other words, the pattern for the longitudinal line segments 71 in which the closer to a longitudinal edge a segment is, the longer such a segment is in length, is only an illustrated example of an embodiment of the present invention. Certainly, the longitudinal line segments 71 that are perpendicular to and possibly meeting with the lateral line segment 70 can be in a reverse pattern, wherein the closer to a longitudinal edge, the shorter such a segment is, or, alternately, in a pattern wherein all segments are of the same length, or other arrangements. These kinds of modifications are well understood by those in the art, and therefore are not further detailed herein.

In view of the above, the fabrication method for a display panel of the present includes the steps of forming a specific pattern for a dielectric on a surface of the lower substrate, and rolling and pressing the upper flexible substrate in a fixed direction with the aid of a rolling press, thereby enabling the patterned dielectric to be evenly dispersed between the upper flexible substrate and the lower substrate and cured. Accordingly, the dielectric is filled in the process of fabricating a display panel at atmospheric pressure, the formation of air bubbles is prevented, the difficulties in operation are lessened, the cost of fabricating a liquid crystal panel is reduced, and also the production yield of liquid crystal panels is enhanced. In addition, when the present invention is applied, panels can be formed from small-sized and large-sized flexible substrates; therefore, the present invention is capable of overcoming many of the drawbacks of the prior art, and accordingly providing the industry with high application value.

In future developments, the fabrication technique of the present invention is applicable to a roll-to-roll fabrication technique, and provides a means of achieving high-speed fabrication, high yield, and low equipment costs.

The foregoing descriptions of the detailed embodiments are only illustrated to disclose the features and functions of the present invention and are not restrictive of the scope of the present invention. It should be understood by those in the art that various modifications and variations performed according to the spirit and principles of the disclosure of the present invention should fall within the scope of the appended claims.

What is claimed is:

1. A fabrication method for a display panel, which is applicable at atmospheric pressure, the fabrication method comprising the steps of:
    providing an upper flexible substrate and a lower substrate, wherein an edge of the upper flexible substrate is affixed to that of the lower substrate so as to be rolled together in alignment;
    forming a sealant structure on an inward-facing surface of the lower substrate;
    forming a dielectric on the inward-facing surface of the lower substrate correspondingly inside the sealant structure, wherein the dielectric is formed in a pattern comprising at least one lateral line segment relatively parallel with the affixed edges and a plurality of longitudinal line segments, in which for each of the longitudinal line segments of the pattern, the closer the longitudinal line segment is disposed to one of the longitudinal edges, the longer the longitudinal line segment is;
    rolling and pressing the upper flexible substrate starting from the lateral line segment in a fixed direction with the use of a rolling press, thereby allowing the dielectric formed within the sealant structure to be evenly dispersed between the upper flexible substrate and the lower substrate; and
    curing the upper flexible substrate and the lower substrate.

2. The fabrication method for a display panel of claim 1, further comprising the steps of fabricating the upper flexible substrate and the lower substrate.

3. The fabrication method for a display panel of claim 1, wherein the upper flexible substrate and the lower substrate are transparent substrates or a combination of a transparent substrate and an opaque substrate.

4. The fabrication method for a display panel of claim 1, wherein the lower substrate is one of a flexible substrate and a glass substrate.

5. The fabrication method for a display panel of claim 4, wherein the lower substrate is one selected from the group consisting of a polycarbonate (PC) substrate, polyether resin (PES) substrate, polyethylene terephthalate (PET) substrate, and polyimide (PI) substrate.

6. The fabrication method for a display panel of claim 1, wherein the dielectric is one of liquid crystal and liquid crystal material.

7. The fabrication method for a display panel of claim 1, wherein the dielectric is formed by drop filling, spray printing, tape adhering, or brush dispensing.

8. The fabrication method for a display panel of claim 1, wherein the rolling press is a flexible pressing roller.

9. The fabrication method for a display panel of claim 1, wherein an included angle between the lateral line segment and a central axis of the rolling press is within a range of −10 to 10 degrees.

10. The fabrication method for a display panel of claim 9, wherein the lateral line segment is straight, dotted, broken, curved, or an irregularly-shaped line segment.

11. The fabrication method for a display panel of claim 1, wherein the included angle between the longitudinal line segments and the central axis of the rolling press is with in a range of from 80 to 100 degrees.

12. The fabrication method for a display panel of claim 11, wherein the longitudinal line segments are straight, dotted, broken, curved, or irregularly-shaped line segments.

13. The fabrication method for a display panel of claim 1, wherein the included angle between the lateral line segment and the longitudinal line segments is within a range of from 80 to 100 degrees.

14. The fabrication method for a display panel of claim 1, wherein the curing process is performed by correspondingly pressing and curing the sealant.

15. A dielectric configuration for a display panel, which is applicable at atmospheric pressure and to a lower substrate that has dielectric formed thereon, the configuration comprising:
 at least one lateral line segment formed on the surface of the lower substrate; and
 a plurality of longitudinal line segments formed on the surface of the lower substrate, wherein for each of the longitudinal line segments of the configuration, the closer the longitudinal line segment is disposed to one of the longitudinal edges, the longer the longitudinal line segment is.

16. The dielectric configuration for a display panel of claim 15, wherein an included angle between the lateral line segment and the plurality of longitudinal line segments is within a range of from 80 to 100 degrees.

17. The dielectric configuration for a display panel of claim 16, wherein the lateral line segment is straight, dotted, broken, curved, or an irregularly-shaped line segment.

18. The dielectric configuration for a display panel of claim 16, wherein the longitudinal line segments are straight, dotted, broken, curved, or irregularly-shaped line segments.

* * * * *